(12) United States Patent
Brotherton-Ratcliffe et al.

(10) Patent No.: US 8,154,584 B2
(45) Date of Patent: Apr. 10, 2012

(54) IMAGE CAPTURE SYSTEM FOR A DIGITAL HOLOGRAPHIC PRINTER

(75) Inventors: David Brotherton-Ratcliffe, Pease Pottage (GB); Andrej Nikolskij, Vilnius (LT); Stanislovas Zacharovas, Vilnius (LT); Julius Pileckas, Vilnius (LT); Ramunas Bakanas, Vilnius (LT)

(73) Assignee: Geola Technologies Ltd. (GB)

( * ) Notice: Subject to any disclaimer, the term of this patent is extended or adjusted under 35 U.S.C. 154(b) by 896 days.

(21) Appl. No.: 12/066,620

(22) PCT Filed: Sep. 8, 2006

(86) PCT No.: PCT/GB2006/003319
§ 371 (c)(1),
(2), (4) Date: Aug. 27, 2008

(87) PCT Pub. No.: WO2007/031715
PCT Pub. Date: Mar. 22, 2007

(65) Prior Publication Data
US 2009/0147072 A1    Jun. 11, 2009

(30) Foreign Application Priority Data
Sep. 12, 2005    (GB) .................................. 0518554.1

(51) Int. Cl.
*H04N 5/89* (2006.01)
(52) U.S. Cl. ........................................................ 348/40
(58) Field of Classification Search .................... 348/40
See application file for complete search history.

*Primary Examiner* — Joseph Avellino
*Assistant Examiner* — Marshall McLeod
(74) *Attorney, Agent, or Firm* — Cantor Colburn LLP

(57) ABSTRACT

An image capture system for a digital holographic printer is disclosed comprising a digital camera (22) having a relatively small horizontal field of view (29). The camera (22) is translated along a rail (21). As the camera (22) is translated along the rail (21) the camera (22) is also rotated so that it faces a target point of an object which is to be reproduced as an hologram. The image data which is obtained by the camera (22) is converted into image data which corresponds with image data which would have been obtained had a non-rotating camera having a substantially higher horizontal field of view been translated along the rail (21) and been used to capture images of the object.

17 Claims, 7 Drawing Sheets

First image processed

Central image processed

Last image processed

IMAGE CAPTURE SYSTEM FOR A DIGITAL HOLOGRAPHIC PRINTER

The present invention relates to the field of digital holographic printing and image capture. More particularly, the present invention relates to high quality rapid digital image capture of image data as required by modern digital holographic printers.

Simple digital stereographic hologram printers were developed in the 1970s and typically used image data obtained using a static movie camera and a rotating stage on which a subject was placed. Later, reflex cameras on a rail were used to generate data particularly for small embossed holograms but also for larger work. Due to the poor quality of these early stereographic printers, data image capture was not perceived as being a particular problem.

However, more recently, full colour dot-matrix printers such as those manufactured by XYZ Imaging Inc (Canada), Zebra Imaging Inc (USA) and Geola Technologies Ltd (UK) have been developed which are capable of producing much higher quality horizontal parallax only ("HPO") reflection holograms. It is now possible to produce individual holograms having a size of up to 1×1.5 m, and individual holograms can be joined together to make bill-board size displays.

The new generation of holographic printers which has been developed places fundamentally new pressures on image capture systems particularly for the production of holograms based upon real-life objects. Due to the increased size and increased resolution required for holograms, up to 1000 high resolution pictures must now be captured within a few seconds from a real-life scene if an HPO hologram of the scene is successfully to be printed. Furthermore, the field of view ("FOV") of the hologram needs to be around 100°.

The need to produce high resolution holograms having a high FOV means that translating a forward facing (i.e. non-rotating) digital camera on a rail is impractical since current digital cameras do not have a sufficiently large CCD array. It will be appreciated that when the camera is at either end of the rail then the object will only be viewable at the extreme lefthand or righthand side of the camera view. As a result a very low resolution image of the object will be recorded on a tiny fraction of the overall CCD array. The rest of the CCD array will record background images which do not include the object and which are not desired to be printed as a hologram. Furthermore, if a sufficiently wide field of view lens were used then the resulting images would be severely distorted.

One known approach to image capture was to attempt to translate a CCD array within a camera as the camera translates on a rail in order to attempt to reposition the image relative to the CCD array. However, this approach involves producing a highly specialized camera and making extremely precise high speed movements of the CCD array. Such an approach requires expensive and highly sensitive equipment. Furthermore, the resulting image is still severely distorted by the need to use a camera having an extremely high FOV lens.

It is therefore desired to provide an alternative image capture system for use with a holographic printer which does not suffer from the above mentioned problems.

According to an aspect of the present invention there is provided an image capture system for capturing first image data and for converting or transforming the first image data into second image data which can be subsequently used by a holographic printer to produce a hologram, the image capture system comprising:

a rotatable camera having a lens having a first horizontal field of view and wherein the rotatable camera is arranged to produce first image data;

a guide or rail along which the rotatable camera is moved or translated in use;

translation means arranged to move or translate the rotatable camera along the guide or rail;

rotation means arranged to rotate the rotatable camera whilst the camera moves or translates along the guide or rail; and image transformation means arranged to convert or transform the first image data into the second image data, wherein the second image data corresponds to image data that would be produced by an image capture system comprising a non-rotating camera which moves or translates along the guide or rail and wherein the non-rotating camera comprises a lens having a second horizontal field of view which is substantially greater than the first horizontal field of view.

The first horizontal field of view of the rotating camera is preferably relatively low and is preferably selected from the group consisting of: (i) 0-10°; (ii) 10-20°; (iii) 20-30°; (iv) 30-40°; (v) 40-50°; and (vi) <50°. In contrast, the second horizontal field of view of the idealised non-rotating camera is preferably relatively high and is preferably selected from the group consisting of: (i) 50-60°; (ii) 60-70°; (iii) 70-80°; (iv) 80-90°; (v) 90-100°; (vi) >100°.

The rotatable camera preferably comprises a digital camera and preferably comprises a Complementary Metal Oxide Semiconductor ("CMOS") sensor, detector or array.

The rotatable camera preferably has a pixel resolution selected from the group consisting of: (i) at least 500×500; (ii) at least 750×750; (iii) at least 1000×1000; (iv) at least 1280×1024; and (v) at least 1500×1250. The pixel resolution of the rotatable camera preferably corresponds with a commercially available digital camera.

The rotatable camera preferably has a camera frame rate selected from the group consisting of: (i) $\geq$1 frame per second; (ii) $\geq$10 frames per second; (iii) $\geq$20 frames per second; (iv) $\geq$30 frames per second; (v) $\geq$40 frames per second; (vi) $\geq$50 frames per second; (vii) $\geq$60 frames per second; (viii) $\geq$70 frames per second; (ix) $\geq$80 frames per second; (x) $\geq$90 frames per second; (xi) $\geq$100 frames per second; (xii) $\geq$150 frames per second; (xiii) $\geq$200 frames per second; (xiv) $\geq$250 frames per second; (xv) $\geq$300 frames per second; (xvi) $\geq$350 frames per second; (xvii) $\geq$400 frames per second; (xviii) $\geq$450 frames per second; and (xix) $\geq$500 frames per second.

The rotatable camera preferably has a camera frame rate selected from the group consisting of: (i) $\leq$1 frame per second; (ii) $\leq$10 frames per second; (iii) $\leq$20 frames per second; (iv) $\leq$30 frames per second; (v) $\leq$40 frames per second; (vi) $\leq$50 frames per second; (vii) $\leq$60 frames per second; (viii) $\leq$70 frames per second; (ix) $\leq$80 frames per second; (x) $\leq$90 frames per second; (xi) $\leq$100 frames per second; (xii) $\leq$150 frames per second; (xiii) $\leq$200 frames per second; (xiv) $\leq$250 frames per second; (xv) $\leq$300 frames per second; (xvi) $\leq$350 frames per second; (xvii) $\leq$400 frames per second; (xviii) $\leq$450 frames per second; and (xix) $\leq$500 frames per second.

The rotating camera preferably comprises a zoom lens.

The guide or rail preferably comprises a mechanical rail.

The translation means is preferably arranged to translate or move the rotatable camera at a substantially constant rate or velocity whilst the rotatable camera captures images of an object which is at least partially to be reproduced as a hologram. The translation means preferably comprises one or more electromechanical servo or stepper motors for translating or moving the rotatable camera along the guide or rail.

The rotation means preferably comprises a rotation stage and wherein the rotatable camera is mounted to the rotation stage. The rotation means preferably comprises one or more electromechanical servo or stepper motors for rotating the rotatable camera.

The image capture system preferably further comprises a controller for controlling the translation means and the rotation means. The controller is preferably arranged to control the translation means and the rotation means so that the rotatable camera moves or translates along the guide or rail at a substantially constant velocity whilst taking images of an object and wherein the rotatable camera at the same time rotates so as to point towards a target point. The target point is preferably a fixed point of the object. The target point preferably corresponds with a centre point of the object and/or a point of the object which corresponds with a centre point of a hologram to be produced. However, according to an alternative embodiment the target point may vary whilst the rotatable camera captures images of the object. This enables a camera having a particularly small FOV to be used.

The image transformation means preferably determines a camera start position and/or a camera end position. The image transformation means may, according to an embodiment, to resize the first image data, apply pixel swap transformations to the resized image data and then downsize the resized image data.

According to an embodiment the image transformation means may be arranged to modify the first image data and/or the second image data so as to compensate for or reduce the effects of optical distortion due to the lens of the rotatable camera. According to an embodiment the image transformation means may be arranged to modify the first image data and/or the second image data so as to compensate for or reduce the effects of motion jitter.

According to an embodiment the second image data may be combined with one or more digitally created or rendered images.

According to an embodiment the first image data and/or the second image data may be resized.

According to an aspect of the present invention there is provided a digital holographic printer system comprising an image capture system as referred to in the above passages.

The digital holographic printer system preferably comprises a digital holographic printer arranged to produce horizontal-parallax only holograms from the second image data.

According to an aspect of the present invention there is provided a digital holographic printer in combination with an image capture system as referred to above.

The digital holographic printer may comprise a 1-step or Direct Write holographic printer wherein final white-light viewable holograms are directly written by the holographic printer. Alternatively, the digital holographic printer may comprise a 2-step or Master Write holographic printer wherein an intermediate hologram is printed by the holographic printer. The intermediate hologram is then converted to a final white-light viewable hologram in a separate process. According to a further embodiment the digital holographic printer may comprise a dual mode holographic printer which is capable of writing either 1-step or Direct Write holograms and/or 2-step or Master Write holograms.

According to an embodiment with a 1-step holographic printer the holographic substrate in or on which the hologram is printed or formed may be located or arranged substantially at the Fourier plane of the lens used to write the hologram. With a 2-step holographic printer the holographic substrate in or on which the hologram is printed or formed may be located or arranged at a position downstream of the Fourier plane of the lens used to write the hologram.

According to an aspect of the present invention there is provided a method of capturing first image data and converting or transforming the first image data into second image data which can be subsequently used by a holographic printer to produce a hologram, the method comprising:

providing a rotatable camera having a lens having a first horizontal field of view and wherein the rotatable camera is arranged to produce first image data;

moving or translating the rotatable camera along a guide or rail;

rotating the rotatable camera whilst the rotatable camera moves or translates along the guide or rail; and converting or transforming the first image data into the second image data, wherein the second image data corresponds to image data that would be produced by an image capture system comprising a non-rotating camera which moves or translates along the guide or rail and wherein the non-rotating camera comprises a lens having a second horizontal field of view which is substantially greater than the first horizontal field of view.

According to an aspect of the present invention there is provided an image capture system for a digital holographic printer system comprising:

a rotatable camera arranged to produce first image data;

means for translating and rotating the rotatable camera; and image transformation means arranged to transform the first image data into second image data for use by the digital holographic printer system.

The rotatable camera preferably has a first horizontal field of view and the second image data corresponds to images that would be produced by a camera having a second horizontal field of view which is substantially greater than the first horizontal field of view.

According to an aspect of the present invention there is provided a method of capturing images for a digital holographic printer system comprising:

providing a rotatable camera arranged to produce first image data;

translating and rotating the rotatable camera; and transforming the first image data into second image data for use by the digital holographic printer system.

The rotatable camera preferably has a first horizontal field of view and the second image data preferably corresponds to images that would be produced by a camera having a second horizontal field of view which is substantially greater than the first horizontal field of view.

According to an aspect of the present invention there is provided a method of printing a hologram comprising:

moving or translating a rotatable camera having a first horizontal field of view along a guide or rail;

rotating said rotatable camera whilst the rotatable camera moves or translates along the guide or rail;

taking a plurality of images of an object using said rotatable camera;

converting or transforming first image data obtained by the rotatable camera into second image data, wherein the second image data corresponds to image data that would be produced by an image capture system comprising a non-rotating camera which moves or translates along the guide or rail and wherein the non-rotating camera comprises a lens having a second horizontal field of view which is substantially greater than the first horizontal field of view; and printing a hologram using the second image data.

According to an aspect of the present invention there is provided a holographic printing system comprising:

a rotatable camera having a first horizontal field of view;

means for moving or translating the rotatable camera along a guide or rail;

means for rotating the rotatable camera whilst the rotatable camera moves or translates along the guide or rail;

means for converting or transforming first image data obtained by the rotatable camera into second image data, wherein the second image data corresponds to image data that would be produced by an image capture system comprising a non-rotating camera which moves or translates along the guide or rail and wherein the non-rotating camera comprises a lens having a second horizontal field of view which is substantially greater than the first horizontal field of view; and means for printing a hologram using the second image data.

The preferred image capture system comprises a relatively inexpensive and portable system that comprises a digital camera which is preferably translated by a stepper motor along a 1-4 m horizontal rail. The direction in which the digital camera points is preferably constantly altered using a rotational electromechanical stage as the camera is translated along the rail.

The camera preferably comprises a low to moderate FOV lens with a zoom-in zoom-out function. A computer running a GUI preferably controls camera operation and movement. Due to the high required frame rates an initial acceleration phase and a final deceleration phase of operation may be provided. In between the initial acceleration phase and the final deceleration phase the camera is preferably arranged to be translated at a constant velocity. During this constant velocity phase the camera is preferably arranged to take a plurality of pictures of the object which is to be reproduced as an hologram. The object is preferably a real life object.

According to the preferred embodiment the image data obtained from the rotating camera is preferably transformed to produce high-resolution distortion free image data which is preferably in a format that is suitable for use by a state of the art holographic printer. The image data obtained by or from the rotating camera is preferably converted or transformed into image data that would have been produced had a non-rotating camera having a much higher FOV lens been translated along the rail without rotating the camera. Furthermore, the non-rotating camera would need to have a much larger active CCD sensor or detector area or pixel dimension than the sensor or detector area or pixel dimension of the rotating camera according to the preferred embodiment.

According to the preferred embodiment the target point at which the camera points as the camera is being translated along the guide or rail preferably remains fixed. The target point preferably corresponds with the centre of the object and hence the centre of the final hologram. However, according to another embodiment the target point may be varied as a function of camera position. This enables a camera having an even smaller FOV lens to be used.

According to an embodiment the camera data may be resized to a larger dimension. Ray-tracing pixel swap transformations may then be applied to the image data. The image data may then be down-sized.

The preferred image capture system is particularly advantageous compared to known image capture systems and is preferably capable of producing fundamentally higher quality holograms than these which currently can be produced. The preferred image capture system is also portable and for static objects several preferred image capture systems can be linked together to produce exceptionally high quality image data.

According to a preferred embodiment real life scenes can be combined with rendered images of a similar scene which have been digitally created using a 3D visualization program such as 3D StudioMax®. This enables a hologram to be produced which combines real life and imaginary or digitally rendered images.

Various embodiments of the present invention will now be described by way of example only, and with reference to the accompanying drawings in which.

Figure 1:
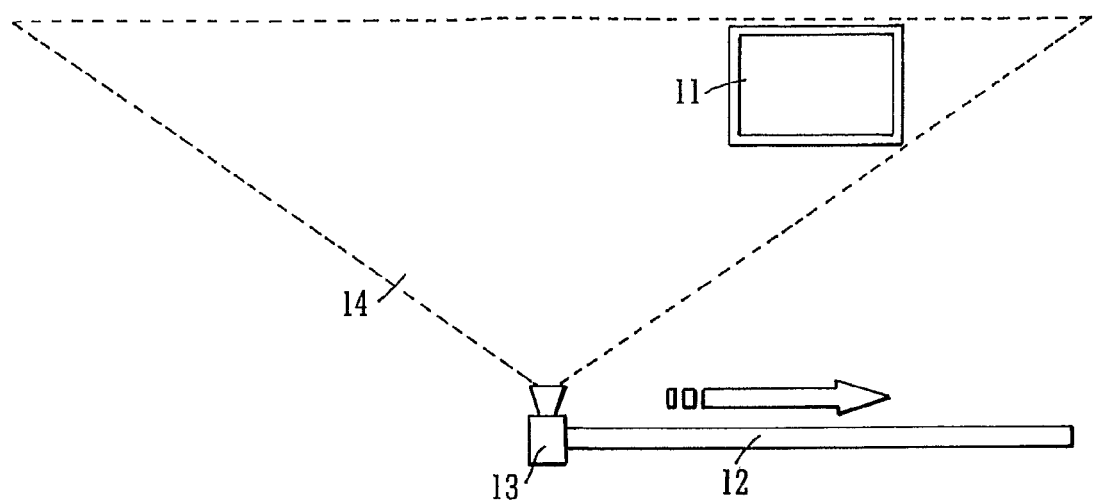
FIG. 1 shows a diagram of an idealised or theoretical image capture system wherein a camera having a high distortion free FOV lens is translated along a rail without rotating the camera.

An idealised or theoretical image capture system which the preferred embodiment seeks to emulate will now be described with reference to FIG. 1. The idealised image capture system comprises a purely translating high-FOV camera mounted on a rail as shown in FIG. 1. A non-rotating camera 13 having a relatively high FOV (e.g. 100°) 14 is shown at the left-most position of a linear translation rail 12. A scene 11 to be filmed with the high-FOV non-rotating camera 13 is also shown. The non-rotating camera 13 is then translated along the linear translation rail 12 with the camera 13 always facing in the same direction (i.e. forwards) which is orthogonal to the orientation or direction of the linear translation rail 12. The direction of movement of the camera 13 is shown by an arrow in FIG. 1. As has already been discussed such an idealised image capture system is impractical because suitably large CCD arrays for use in a camera having a lens having such a large FOV are not currently available and because lenses having a suitably large FOV would result in significant distortions of the recorded images.

Figure 2:
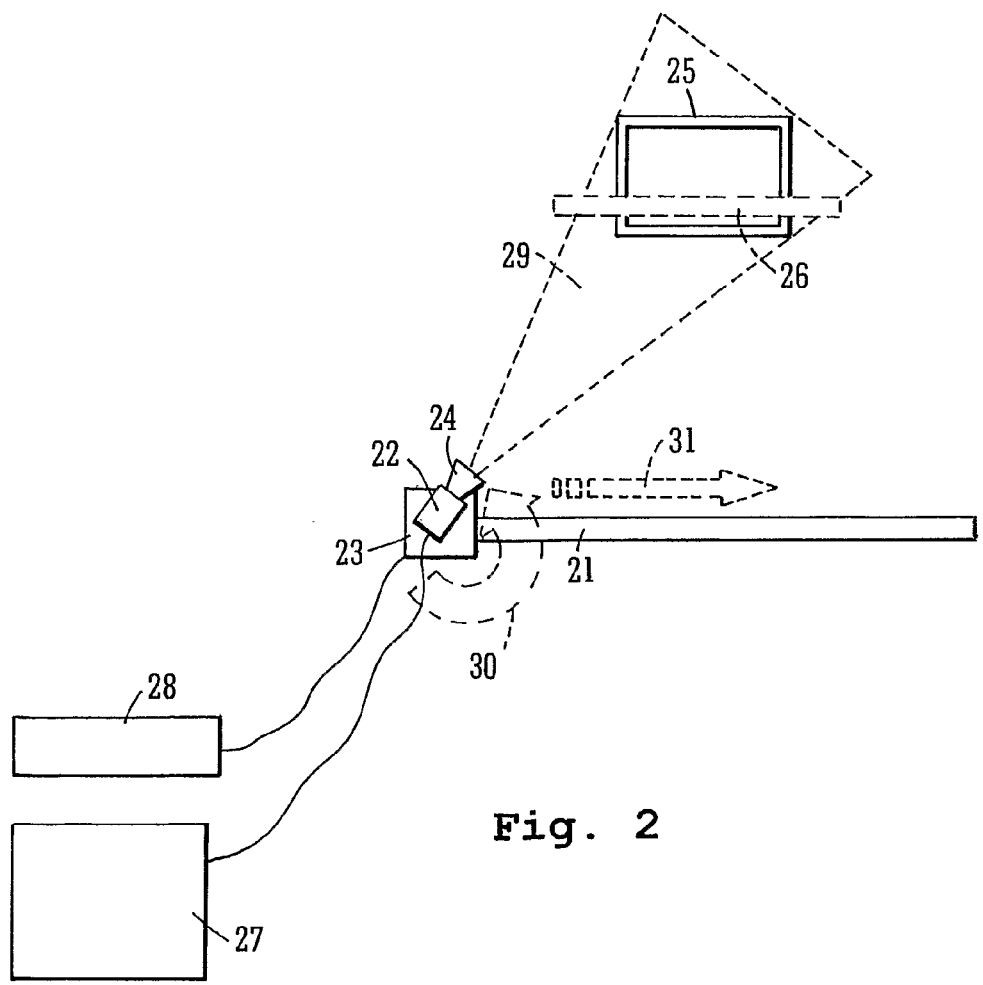
FIG. 2 shows a diagram of a preferred image capture system wherein a camera having a relatively low FOV lens is translated along a rail and the camera is rotated at the same time so that the camera always faces a fixed point on the object.

A preferred embodiment of the present invention will now be described with reference to FIG. 2. The preferred image capture system seeks to emulate the image data which would theoretically be produced if an idealised system such as that shown in FIG. 1 were used to capture images. However, the preferred embodiment uses a conventional digital camera 22 having a small FOV lens and a conventionally sized detector, sensor or array. The lens of the digital camera 22 preferably does not cause significant distortions in the captured images. The image capture system according to the preferred embodiment further comprises an electromechanical stepper-motor rail 21. A digital camera 22 comprising a zoom objective 24 is mounted on a stepper-motor precision rotation stage 23. A controller 28 digitally controls the stepper-motor precision rotation stage 23 and the electromechanical stepper-motor rail movements 28. The controller 28 is connected to a computer 27.

An object 25 to be recorded is preferably placed at a known distance from the rail 21. A movable frame 26 is then preferably used to mark the physical edges of the desired scene which is desired to be printed as a hologram. The frame 26 is preferably placed horizontally parallel to the camera track 21 and at a vertical position such that the camera track height is the same as the centre-point height of the frame 26. The object is preferably placed within the frame 26. Parts of the object 25 which project beyond the front of the frame 26 will project out of the final hologram.

Since the distance of the frame 26 from the camera track 21, the hologram width (which equals the frame width) and the desired horizontal FOV of the final hologram are known, then the preferred camera tracking length can then preferably be calculated (see Eqn. 16).

The camera is preferably arranged to move symmetrically from left to right (or vice versa) about the hologram or frame centre-point. Therefore, given the track length, the camera start and end positions can then be defined or determined.

The camera 22 is preferably positioned at the camera start position and the camera 22 is preferably arranged so as to point at a target point which preferably corresponds with a centre point of the object 25 which is to be reproduced as a hologram. The digital camera 22 is shown in FIG. 2 at the left-most position of the electromechanical stepper-motor rail 21. The camera zoom objective 24 is then preferably adjusted until all of the frame 26 is just visible within the camera viewport.
This process is then preferably repeated at the camera end position. The frame 26 is then preferably removed from the object 25.
The relatively small horizontal FOV 29 of the rotating camera 22 is shown in FIG. 2. It can be seen from comparing FIGS. 1 and 2 that the FOV 29 of the camera 22 according to the preferred embodiment is substantially smaller than the FOV 14 of the idealised non-rotating camera shown in FIG. 1.

The rotating camera 22 is preferably made to move at a substantially constant velocity from one end of the rail 21 to the other. Whilst the camera 22 is moving as indicated by arrow 31, the rotational stage 23 is preferably also substantially continuously activated as indicated by arrow 30 so that the camera 22 preferably always faces the centre point of the frame 26. The camera 22 is preferably arranged to take pictures at regular intervals whilst the camera is being translated along the rail 21. The rotation of the rotation stage 23 and the translation of the camera 22 along the rail is preferably controlled by controller 28 which is in communication with a computer 27. The computer 27 is also in communication with the camera 22 to receive image data from the camera 22.

When the camera 22 has finished taking pictures the image data recorded by the computer 27 is then preferably processed as detailed below. The image data recorded by the hybrid rotating/translating camera 22 according to the preferred embodiment is preferably converted into image data that would have been produced by a purely translating (i.e. non-rotating) camera having a substantially higher FOV and a very high resolution CCD array.

According to the preferred embodiment a conventional digital camera having a Complementary Metal Oxide Semiconductor ("CMOS") sensor or detector such as a MIKROTRON® MC311 High Speed CMOS Camera with Camera Link frame grabber and having a pixel resolution of 1280× 1024 and a maximum frame rate of 500 frames/second may be used. Experimental data was obtained using such a digital camera and a stepmotor and rail system supplied by Isel®. The length of the rail was 4.34 m and linear movements over a length of 4.1 m were used. A rotational stage supplied by Standa® and having a resolution of 200 step motor steps/ degree was used. Custom built electronic controllers for both mechanical advance systems and for camera control and data download were used. A GUI in Microsoft® Visual C++ running under Microsoft® Windows XP that controlled all functions of the preferred system including data processing was also used.

Holograms having sizes ranging from 20×30 cm to 1×1.5 m were produced using the preferred image capture system. For a 1 m×1 m hologram preferably 600 to 1000 camera shots should be taken within a 9-20 time period.

A holographic printer manufactured by XYZ Imaging Inc® was used to produce the holograms using transformed image data according to the preferred embodiment. High resolution RGB digital reflection holograms were produced by the holographic printer using image data produced according to the preferred embodiment. The holograms were of an exceptionally high quality.

Figure 3:
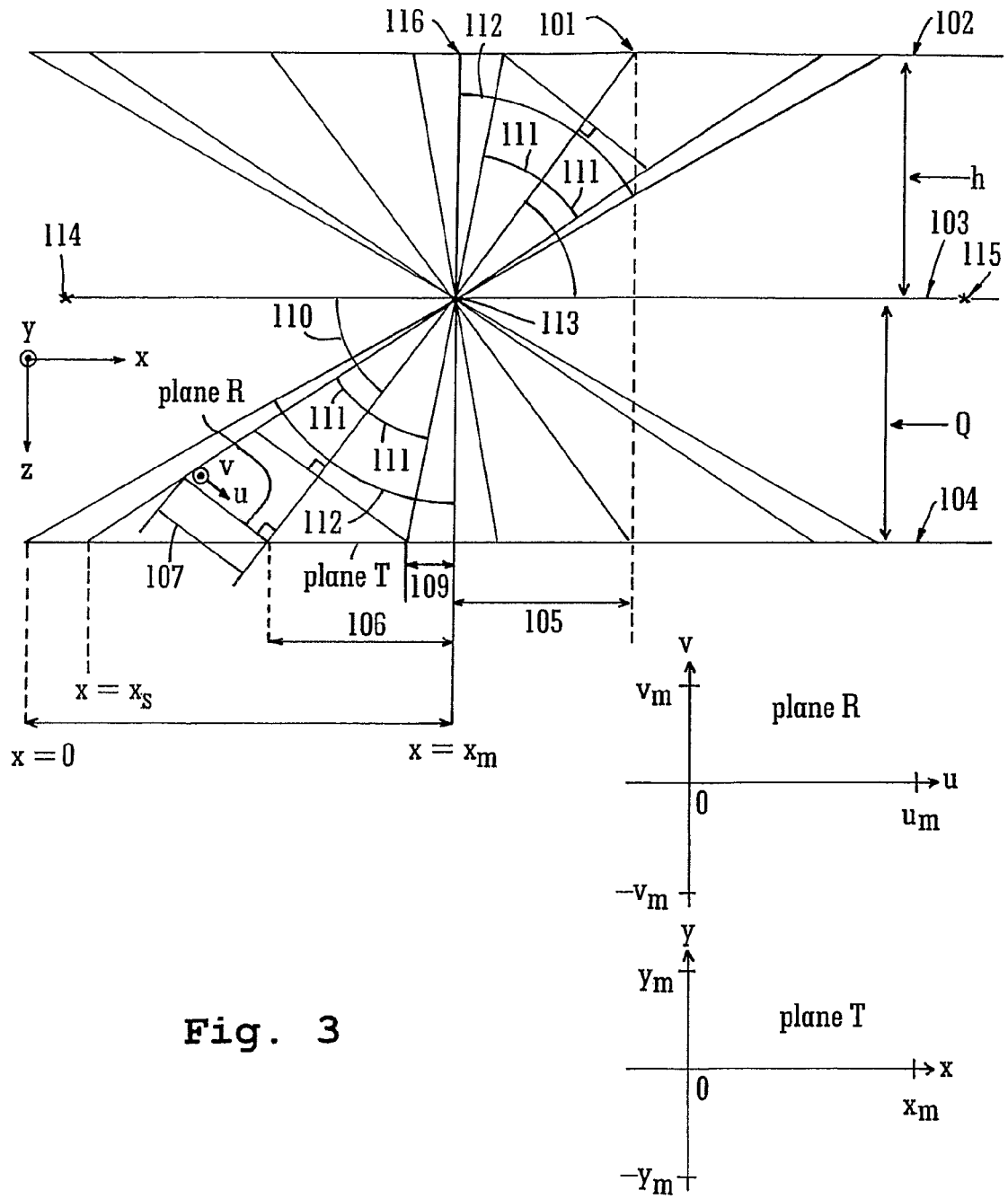
FIG. 3 shows in more detail the geometry of the camera system as used in the preferred image capture system.

FIG. 3 shows a detailed diagram illustrating various geometric aspects of the preferred image capture system. FIG. 3 shows a view from the top representing a slice through the central horizontal plane (y=0). A right handed Cartesian coordinate system (x,y,z) is employed as shown. The object to be recorded is located at a position 101. An idealised pinhole camera of variable FOV is located at position 113 and moves along a horizontal rail 103 from a position 114 to a position 115 at a substantially constant velocity. As the camera is translated from position 114 to position 115 the camera is arranged to take pictures at regular intervals. A particular general camera position located at 113 ($x=x_m$, y=0, z=−Q) is considered for the purposes of geometrical ray-tracing calculations. As the camera moves from position 114 to position 115 the camera also rotates in the horizontal plane such that it constantly points at the point 101. The central camera ray thus makes an angle β (indicated by angle 110 in FIG. 3) with the camera track at the general camera position 113.

Before the camera starts to move the FOV of the camera is set such that the entire object to be recorded is viewable from the two extreme positions 114 and 115. This FOV is equal to twice the angle α. The angle α is represented by angle 111 in FIG. 3.

Considering now a general image plane z=0 (the T-plane) parallel to the vertical object plane situated at z=−h−Q and at a horizontal distance of Q from the camera track which is itself described by the line y=0, z=−Q.

Considering also a general image plane that will be referred to hereafter as the R-plane and which is indicated in the diagram. The R-plane is another vertical plane but which is orthogonal to the central ray passing through the camera. The image that forms on this R-plane is an inverted and undistorted image of the object 101 seen through the camera when positioned at 113.

As discussed above, modern holographic printers require data corresponding to that which would be obtained from a high-FOV forward pointing and purely translating camera which had a lens which did not distort the image data. Such an idealised camera system can be represented on the diagram. The idealised pinhole camera of fixed and high FOV can be considered as moving from position 114 on the rail 103 to position 115 at a constant velocity taking pictures at regular intervals. The idealised camera system always looks straight ahead and does not rotate as it translates. Therefore, at general position 113 the idealised camera points to 116. The T-plane that was introduced above is a general (inverted) image plane of this idealised camera. The FOV of this purely translating camera is twice the angle θ where θ is indicated by angle 112 in FIG. 3.

It is apparent that the visual data concerning the object 101 occupies a tiny fraction of the T-plane. However, the R-plane contains such information very efficiently. Modern holographic printers require visual data on the T-plane. However, it can be seen the T-plane visual data can be generated from the R-plane data. Therefore, the visual or image data recorded by a low-FOV hybrid translating/rotating camera according to the preferred embodiment can be subsequently converted into image data of a form that would be produced by a high-FOV forward facing purely translating camera.

2-dimensional right-handed Cartesian coordinate systems (x,z) and (u,v) will be used to analyse the T-plane and R-plane respectively.

Figure 4:
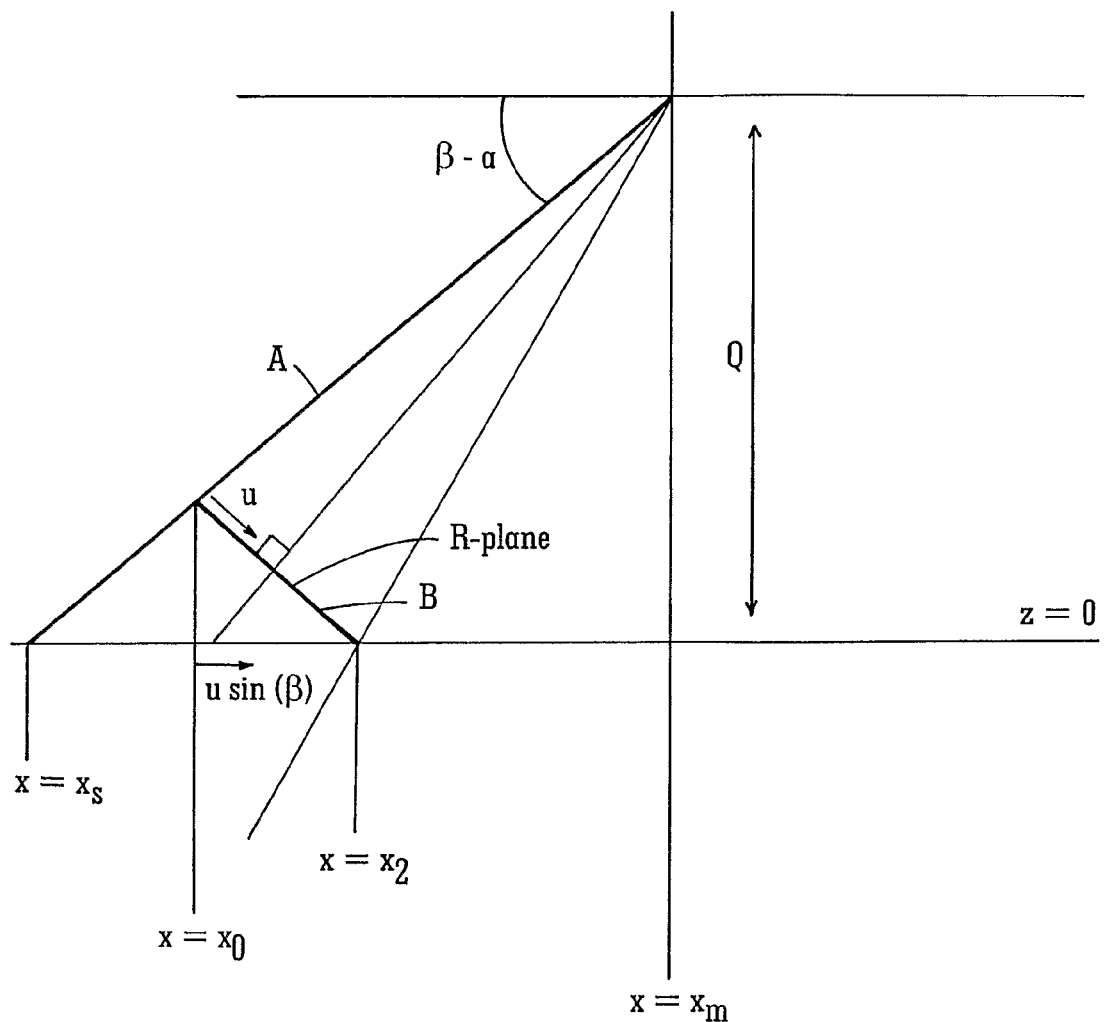
FIG. 4 shows in more detail the geometry of the preferred embodiment and the R and T planes.

FIG. 4 shows a detail of the ray geometry of the R and T-planes. The distance $x_0$ is defined by the intersection of the lines A and B:

$$x_2 = Q\tan(\theta) - Q\cot(\beta+\alpha) \quad (1)$$

$$x_s = Q\tan(\theta) - Q\cot(\beta-\alpha) \quad (2)$$

Line A is defined as the line that goes through the points $(x,z)=(x_s,0)$ and $(x,z)=(x_m,-Q)$. Accordingly, line A is characterised by the equation:

$$z = \frac{Qx}{x_s - x_m} - \frac{Qx_s}{x_s - x_m} \quad (3)$$

Line B is defined as the line that goes through the points $(x,z)=(x_2,0)$ and $(x,z)=(x_2-\in\tan(\beta), -\epsilon)$. Accordingly, line B is characterised by the equation:

$$z = x\cot(\beta) - x_2\cot(\beta) \quad (4)$$

The x coordinate of the intersection of these lines is given by:

$$x_0 = \frac{\frac{Qx_s}{x_s - x_m} - x_2\cot(\beta)}{\frac{Q}{x_s - x_m} - \cot(\beta)} \quad (5)$$

Denoting a general point on the plane R as (u,v). The coordinate systems (u,v) and (x,z) can be related by the transformation:

$$x = x_0 + u\sin(\beta)$$

$$y = v$$

$$z = z_0 + u\cos(\beta) \quad (6)$$

Where:

$$z_0 = Q\frac{x_0 - x_s}{x_s - x_m} \quad (7)$$

Now considering an arbitrary point (U,v) which has coordinates (x,y,z) on R. A ray of light passing through this point also passes through the point $(x_m, 0, -Q)$. A vector that points along this line is therefore:

$$\vec{A} = \begin{pmatrix} x_0 + u\sin(\beta) - x_m \\ v \\ z_0 + u\cos(\beta) + Q \end{pmatrix} \quad (8)$$

Now let the intersection of the ray of light on the plane T be $(x_T, y_T, 0)$.
then:

$$\begin{pmatrix} x \\ y \\ z \end{pmatrix} = \begin{pmatrix} x_T \\ y_T \\ 0 \end{pmatrix} + \lambda\vec{A} \quad (9)$$

The parameter λ can be defined by the z equation:

$$\lambda(z_0 + u\cos(\beta) + Q) = z_0 + u\cos(\beta) \quad (10)$$

giving:

$$\lambda = \frac{z_0 + u\cos(\beta)}{z_0 + u\cos(\beta) + Q} \quad (11)$$

Hence, the transformation from the R plane to the T plane can be written as:

$$x_T = x_0 + u\sin(\beta) - \frac{z_0 + u\cos(\beta)}{z_0 + u\cos(\beta) + Q}(x + u\sin(\beta) - x_m) \quad (12)$$

$$y_T = v\left(1 - \frac{z_0 + u\cos(\beta)}{z_0 + u\cos(\beta) + Q}\right)$$

In order to transform the data set from a hybrid rotating/translating camera to a purely translating camera data set the inverse transform is required. Rewriting the above equations it can be seen that:

$$u = \frac{z_0(x_T - x_m) - Q(x_0 - x_T)}{\cos(\beta)(x_m - x_T) + Q\sin(\beta)} \quad (13)$$

u has a maximum at:

$$u_m = \frac{z_0(x_2 - x_m) - Q(x_0 - x_2)}{\cos(\beta)(x_m - x_2) + Q\sin(\beta)} \quad (14)$$

For each β,u must be rescaled using the above equation to [0,1].

The vertical transformation is given by:

$$v = \frac{y_T}{1 - \frac{z_0 + u\cos(\beta)}{z_0 + u\cos(\beta) + Q}} \quad (15)$$

Considering the data required to make a final hologram whose plane is the object plane 102 of FIG. 3 and whose centre is located at 101. Let this hologram have horizontal dimension D and vertical dimension R. Then, given the horizontal FOV of an idealised translating camera the angle θ can be calculated as half the FOV. The required camera track length is then given by:

$$T = 2h\tan(\theta) - D \quad (16)$$

For the case of dot-matrix holograms which are made up of a grid of holographic pixels printed directly onto the photographic film a pixel size of p will be assumed. For simplicity it will be assumed that the pixels have equal horizontal and vertical dimensions although it will be apparent to someone skilled in the art that this can be generalised to an asymmetric pixel. It will also be apparent to someone skilled in the art as to how other forms of hologram that are printed in multiple steps can be characterized by an effective pixel size.

The respective horizontal and vertical digital dimensions of the final hologram are given as:

$$N_{HH} = \frac{D}{p} + 1 \qquad (17)$$

$$N_{HV} = \frac{R}{p} + 1$$

The respective horizontal and vertical digital dimensions of the T-plane are given as:

$$N_{TH} = \frac{2h\tan(\theta)}{DQ}(N_{HH} - 1) + 1 \qquad (18)$$

$$N_{TV} = N_{HV}$$

The T-plane Cartesian coordinate system can now be digitized as:

$$x_i = (i-1)\delta \quad \forall\, i \in (1 \ldots N_{TH}) \qquad (19)$$

$$y_j = -\frac{RQ}{2h} + (j-1)\delta \quad \forall\, j \in (1 \ldots N_{TV}) \qquad (20)$$

Where:

$$\delta = \frac{RQ}{h(N_{HV} - 1)} \qquad (21)$$

The required camera track length is defined by the horizontal FOV of the idealised translating camera and this has been given above. This FOV is usually a constraint of the holographic printer. The position of both the idealised translating camera and the hybrid camera are always the same on the rail. A general camera position is characterised by a parameter $-\xi$ which is the distance 105 shown on FIG. 3. At the start position of the camera is $\xi=\pm T/2$ and the end position is $\xi=-\mp T/2$, the sign depending of the direction of camera tracking which is chosen.

At the general camera position 113 it is calculated first:

$$\beta = \tan^{-1}\left(\frac{-h}{\xi}\right) \qquad (22)$$

and $$x_m = Q\tan(\theta) \qquad (23)$$

Equations 1, 2, 5 and 7 can now preferably be used to calculate $x_2$, $x_s$, $x_0$ and $z_0$ for all i and j. Some of these parameters depend on α which is half the hybrid camera FOV. This parameter must be chosen as described above such that the hybrid camera can see all of the object from both extreme camera positions on the rail.

Eqn. 13 can then be used to calculate $u_i \equiv u(x_i, y_j, \ldots)\forall(i,j)$. Eqn. 15 can then used in order to calculate $v_{ij} \equiv v(x_i, y_j, \ldots)\forall(i,j)$. Eqn. 14 can then be used to calculate $u_m$ and finally both $u_i$ and $v_{ij}$ are preferably normalized in the following fashion:

$$u_i \Rightarrow u_i/u_{m\forall i,j}$$

$$v_{ij} \Rightarrow v_{ij}/u_m \qquad (24)$$

Denoting the R-plane and T-plane digital intensity distributions in the red, green and blue respectively as $R_{ij}, G_{ij}, B_{ij}$ and $R^*_{ij}, G^*_{ij}, B^*_{ij}$ then the T-plane data can be written in terms of the R-plane data by the following transformation:

$$R^*_{ij} = R_{\mu\nu}$$

$$G^*_{ij} = G_{\mu\nu}, \quad \forall i, \forall j \in (1 \geq u \geq 0)$$

$$B^*_{ij} = B_{\mu\nu}$$

$$R^*_{ij} = 0$$

$$G^*_{ij} = 0 \quad \forall i, \forall j \notin (1 \geq u \geq 0)$$

$$B^*_{ij} = 0 \qquad (25)$$

where:

$$u^* = \mathrm{int}(N_{RH} + 1 - u_i(N_{RH} - 1) + 1) \qquad (26)$$

$$v^* = \mathrm{int}\left(N_{RV} + 1 - \left(v_{ij}(N_{RH} - 1) + 1 + \frac{1}{2}(N_{RV} - 1)\right)\right)$$

and:

$$\mu = N_{TH} + 1 - \mu^*$$

$$v = N_{TH} + 1 - v^* \text{ when } \xi \leq 0 \text{ and otherwise } v = v^* \qquad (27)$$

and where: $(i,j) \in (1 \ldots N_{TH}, 1 \ldots N_{TV})$

It is to be noted that Eqn. 27 simply inverts the image. Hence, at each general camera position it is possible to collect image data from a hybrid translating/rotating camera and to convert this into the equivalent T-plane data. This data can then be used to print high quality holograms using a modern holographic printer without attempting to use an impractical system comprising an extremely large CCD array and prohibitively large camera objective FOV. Note also that Q can be chosen arbitrarily.

The transformations that have been presented above are pixel swapping transformations and therefore these transformations may introduce some noise into the final images due to the presence of the int functions. Accordingly, an image interpolation routine on all R-plane data may first be used so that the pixel dimensions of each hybrid camera shot are increased by around ten times. The transformations given by Eqns. 25-27 can then be performed in this larger digital space. Once the transformations have been performed the T-plane data which is also in a digital space tens times more refined, can then preferably be cut down using the same image interpolation routine to the proper dimensions. In this way it is possible to achieve near perfect T-plane data.

After such transformations have been calculated it is also possible, using standard resizing algorithms, to reduce the size of each image in such a way as to make it possible to print as a final hologram a three-dimensional image of the captured scene in a reduced size.

Figure 5:
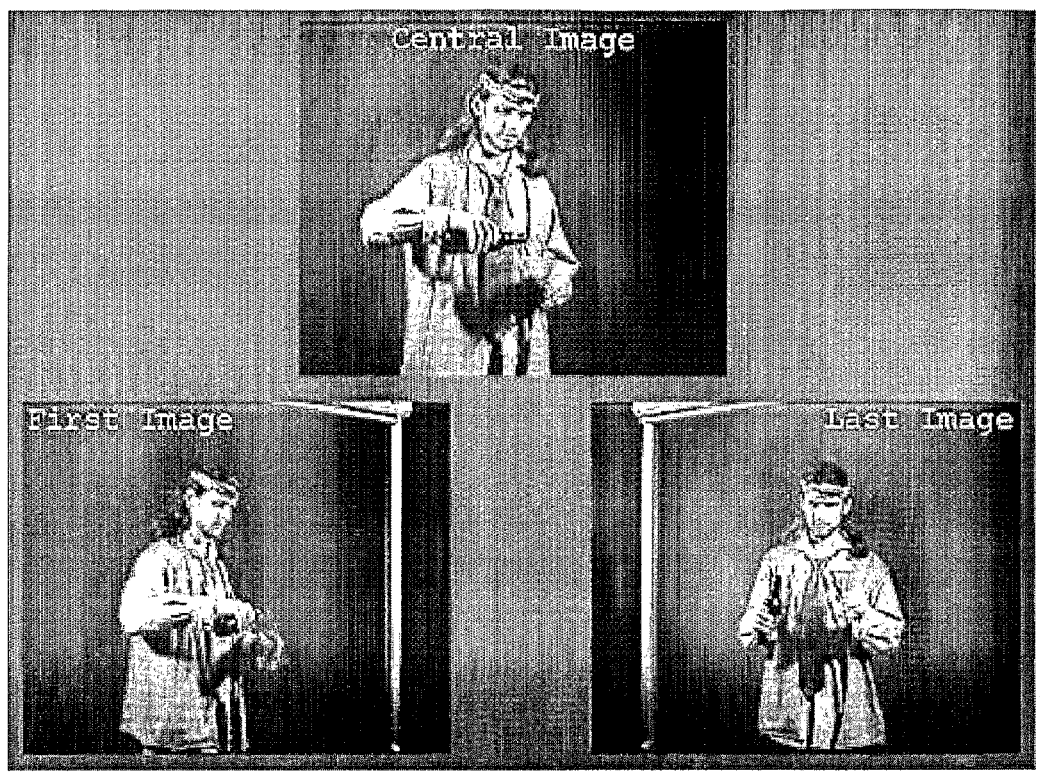
FIG. 5 shows raw camera frames taken using the preferred image capture system at start, middle and end positions along the rail.

FIG. 5 shows raw camera data taken with a hybrid rotating/translating camera according to a preferred embodiment. From left to right the camera is at the left of track, middle and extreme right. The track length was 3083.47 mm and the distance to object was 2416 mm. The camera horizontal FOV was 29.008°. The scene dimensions were 1.25 m (width)× 1.00 m (height)×2.00 m (depth).

Figure 6:
FIG. 6 shows processed images of the images shown in FIG. 5 and corresponds with images which would have been obtained had a high-FOV purely-translating camera been used to take the images.
Figure 6:
Figure 6:

FIG. 6 shows corresponding transformed and cut T-plane data. The frames have been cut so that only the central portion of the T-plane containing the image is displayed. This is required by some holographic printers.

Figure 7:
FIG. 7 shows a picture of a final hologram printed using a dot-matrix colour printer and using the processed data shown in FIG. 6.
Figure 8:
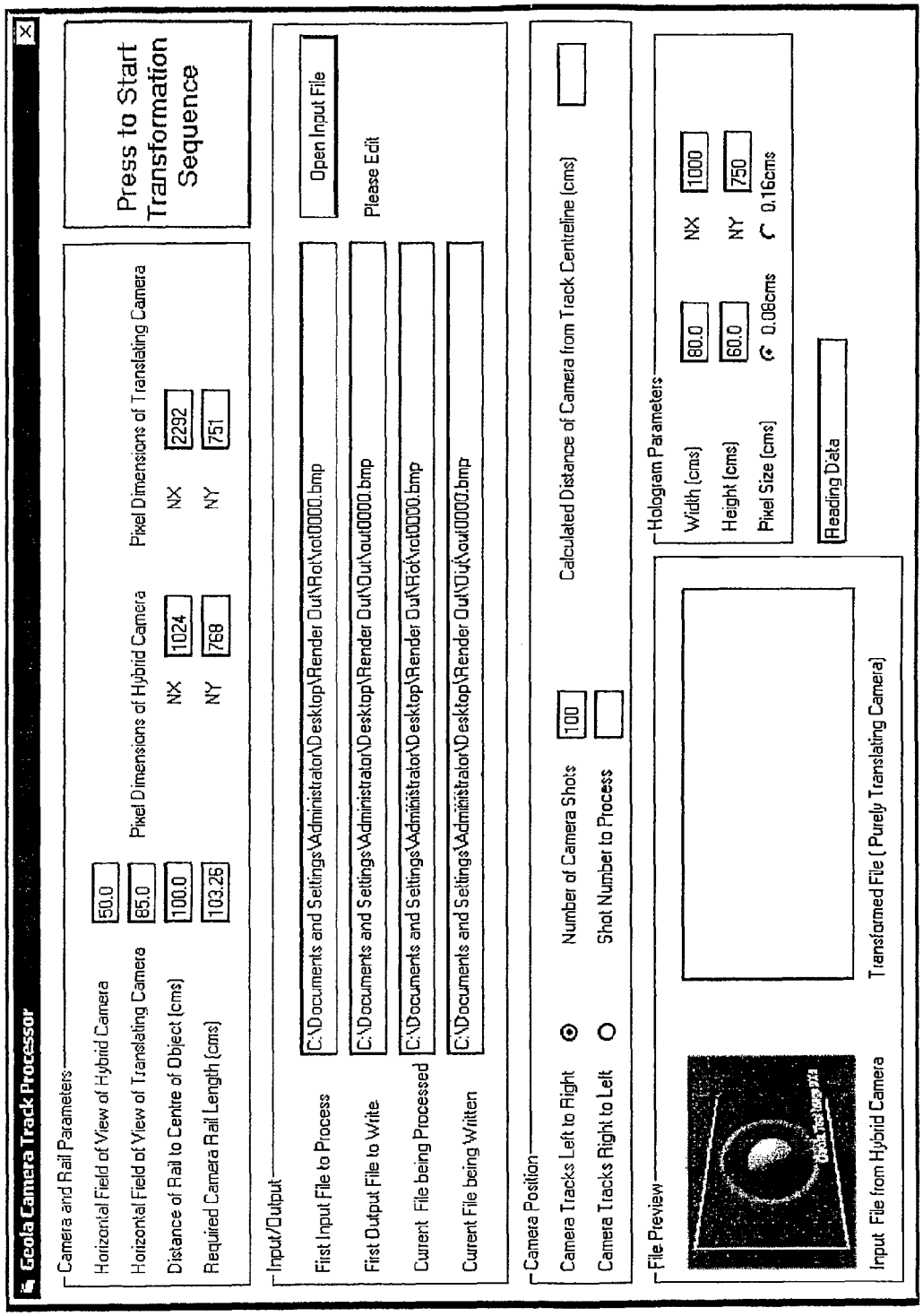
FIG. 8 shows a screen shot of the GUI of a demonstration Visual Basic program listed in the appendix.

FIG. 7 shows a picture of a final colour (resized) hologram having a dimension of 30×40 cm and printed using a modern dot-matrix holographic printer using the T-plane data obtained according to the preferred embodiment.

The preferred image transformation process described above may be modified by defining an optimal target position which is not at the exact centre point of the hologram. This enables an even smaller FOV lens to be used in the camera for a given translating camera horizontal FOV. According to an embodiment the target position may be made to vary as a function of the camera position thereby enabling the smallest possible camera horizontal FOV to be used and the greatest image fidelity of the final hologram to be obtained.

Even small horizontal FOV objective lenses will have some residual $5^{th}$ (Siedel) coefficient which can distort the camera image to a small degree. According to an embodiment such distortion may be compensated for by using a modified numerical transformation without appreciable loss of image resolution.

The preferred image capture system preferably comprises fast system which preferably enables many pictures to be taken quickly so that motion does not destroy the parallax of the final hologram. However, some motion jitter can nonetheless occur and this can introduce random displacements of the image within the camera viewport. According to an embodiment the motion jitter from frame to frame can be analysed and each frame can be numerically adjusted to produce a jitter-free image set. This can be done by calculating the expected parallaxes of certain fixed and known point features within the object space and then comparing these to the actual data. By comparing many such points a best fit to both the rotational and translational jitter functions can be derived and the jitter can then be transformed away.

The preferred image capture system relates to a simple and portable system that is capable of producing high quality image data as required by modern digital holographic printers but without involving a highly complex, expensive and impractical camera system. The preferred image capture system can preferably utilise a relatively inexpensive conventional CMOS digital camera having a relatively low horizontal FOV zoom lens. The combination of a rapidly rotating and translating camera with appropriate image transformation enables holograms to be produced, particularly of real objects, which are significantly higher quality than those currently produced by conventional holographic printers and associated image capture systems.

Although the present invention has been described with reference preferred embodiments, it will be understood by those skilled in the art that various changes in form and detail may be made without departing from the scope of the invention as set forth in the accompanying claims.

The invention claimed is:

1. An image capture system for capturing first image data and for converting or transforming said first image data into second image data which can be subsequently used by a holographic printer to produce a hologram, said image capture system comprising:
   a rotatable camera having a lens having a first horizontal field of view and wherein said rotatable camera is arranged to produce first image data;
   a guide or rail along which said rotatable camera is moved or translated in use;
   translation means arranged to move or translate said rotatable camera along said guide or rail; rotation means arranged to rotate said rotatable camera whilst said camera moves or translates along said guide or rail; and image transformation means arranged to convert or transform said first image data into said second image data, wherein said second image data corresponds to image data that would be produced by an image capture system comprising a non-rotating camera which moves or translates along said guide or rail and wherein said non-rotating camera comprises a lens having a second horizontal field of view which is substantially greater than said first horizontal field of view, wherein said image transformation means is arranged to resize said first image data, to apply a pixel swap transformation to said resized image data and then to downsize said resized image data.

2. An image capture system as claimed in claim 1, wherein said translation means comprises one or more electromechanical servo or stepper motors for translating or moving said rotatable camera along said guide or rail.

3. An image capture system as claimed in claim 1, wherein said rotation means comprises a rotation stage and wherein said rotatable camera is mounted to said rotation stage.

4. An image capture system as claimed in claim 1, wherein said rotation means comprises one or more electromechanical servo or stepper motors for rotating said rotatable camera.

5. An image capture system as claimed in claim 1, further comprising a controller for controlling said translation means and said rotation means.

6. An image capture system as claimed in claim 5, wherein said controller is arranged to control said translation means and said rotation means so that said rotatable camera moves or translates along said guide or rail at a substantially constant velocity whilst taking images of an object and wherein said rotatable camera at the same time rotates so as to point towards a target point.

7. An image capture system as claimed in claim 6, wherein said target point is a fixed point of said object.

8. An image capture system as claimed in claim 6, wherein said target point corresponds with one of: (i) a centre point of said object, and (ii) a point of said object which corresponds with a centre point of a hologram to be produced.

9. An image capture system as claimed in claim 6, wherein said target point varies whilst said rotatable camera captures images of said object.

10. An image capture system as claimed in claim 1, wherein said image transformation means determines one of: (i) a camera start position, and (ii) a camera end position.

11. An image capture system as claimed in claim 1, wherein said image transformation means is arranged to modify one of: (i) said first image data, and (ii) said second image data so as to compensate for or reduce the effects of optical distortion due to said lens of said rotatable camera.

12. An image capture system as claimed in claim 1, wherein said image transformation means is arranged to modify one of: (i) said first image data, and (ii) said second image data so as to compensate for or reduce the effects of motion jitter.

13. An image capture system as claimed in claim 1, wherein said second image data is combined with one or more digitally created or rendered images.

14. An image capture system as claimed in claim 1, wherein one of: (i) said first image data, and (ii) said second image data is resized.

15. A method of capturing first image data and converting or transforming said first image data into second image data which can be subsequently used by a holographic printer to produce a hologram, said method comprising:

providing a rotatable camera having a lens having a first horizontal field of view and wherein said rotatable camera is arranged to produce first image data;

moving or translating said rotatable camera along a guide or rail;

rotating said rotatable camera whilst said rotatable camera moves or translates along said guide or rail; and converting or transforming said first image data into said second image data, wherein said second image data corresponds to image data that would be produced by an image capture system comprising a non-rotating camera which moves or translates along said guide or rail and wherein said non-rotating camera comprises a lens having a second horizontal field of view which is substantially greater than said first horizontal field of view, wherein converting or transforming said first image data further comprises resizing said first image data, applying a pixel swap transformations to said resized image data, and downsizing said resized image data.

16. A method of printing a hologram comprising:

moving or translating a rotatable camera having a first horizontal field of view along a guide or rail; rotating said rotatable camera whilst said rotatable camera moves or translates along said guide or rail; taking a plurality of images of an object using said rotatable camera; converting or transforming first image data obtained by said rotatable camera into second image data, wherein said second image data corresponds to image data that would be produced by an image capture system comprising a non-rotating camera which moves or translates along said guide or rail and wherein said non-rotating camera comprises a lens having a second horizontal field of view which is substantially greater than said first horizontal field of view, wherein converting or transforming said first image data further comprises resizing said first image data, applying a pixel swap transformation to said resized image data, and downsizing said resized image data; and printing a hologram using said second image data.

17. A holographic printing system comprising:

a rotatable camera having a first horizontal field of view; means for moving or translating said rotatable camera along a guide or rail; means for rotating said rotatable camera whilst said rotatable camera moves or translates along said guide or rail;

means for converting or transforming first image data obtained by said rotatable camera into second image data, wherein said second image data corresponds to image data that would be produced by an image capture system comprising a non-rotating camera which moves or translates along said guide or rail and wherein said non-rotating camera comprises a lens having a second horizontal field of view which is substantially greater than said first horizontal field of view, wherein said means for converting or transforming first image data is arranged to resize said first image data, to apply a pixel swap transformation to said resized image data and then to downsize said resized image data; and means for printing a hologram using said second image data.

* * * * *